(12) United States Patent
Liu et al.

(10) Patent No.: US 9,631,733 B2
(45) Date of Patent: Apr. 25, 2017

(54) PLUNGER TYPE SAFETY VALVE

(71) Applicant: Xiamen Runner Industrial Corporation, Xiamen (CN)

(72) Inventors: Bo-huang Liu, Xiamen (CN); Yong-sheng Ding, Xiamen (CN); Wei-qiang Xu, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 15/000,621

(22) Filed: Jan. 19, 2016

(65) Prior Publication Data

US 2016/0305560 A1 Oct. 20, 2016

(30) Foreign Application Priority Data

Apr. 15, 2015 (CN) ............... 2015 2 0223705 U

(51) Int. Cl.
*F16K 31/12* (2006.01)
*F16K 17/04* (2006.01)

(52) U.S. Cl.
CPC ............ *F16K 17/048* (2013.01); *F16K 17/04* (2013.01)

(58) Field of Classification Search
CPC . F16K 17/00; F16K 3/24; F16K 17/04; F16K 17/048; Y10T 137/2703; Y10T 137/2705; Y10T 137/2514; Y10T 137/2516; Y10T 137/2521; Y10T 137/7781
See application file for complete search history.

(56) References Cited

U.S. PATENT DOCUMENTS

| 4,885,084 A * | 12/1989 | Doyle | B01F 3/0446 137/494 |
|---|---|---|---|
| 2006/0131228 A1* | 6/2006 | Truong | E03C 1/04 210/449 |
| 2009/0090661 A1* | 4/2009 | Tanner | C02F 1/003 210/87 |
| 2010/0170857 A1* | 7/2010 | Williams | B01D 35/147 210/741 |
| 2014/0150906 A1* | 6/2014 | Shaffer | E03B 7/074 137/544 |
| 2015/0083666 A1* | 3/2015 | Bassett | B01D 61/10 210/652 |

\* cited by examiner

*Primary Examiner* — Jessica Cahill
(74) *Attorney, Agent, or Firm* — Chun-Ming Shih

(57) ABSTRACT

A plunger type safety valve includes a valve body, a valve rod, and a tube piece. The valve body is provided with a first water inlet port and a first water outlet port, the first water inlet port is connected to a water pipe of a local water supply plant, while the first water outlet port is connected to a water input end of a filtering device. The valve rod is disposed vertically in an inner chamber of the valve body, to switch between connection and disconnection of the first water inlet port and the first water outlet port. And the tube piece is connected fixedly with a lower end of the valve body, to form into a chamber body, and is provided with a second water inlet port and a second water outlet port.

3 Claims, 4 Drawing Sheets

PLUNGER TYPE SAFETY VALVE

BACKGROUND OF THE INVENTION

Field of the Invention

The present invention relates to a safety valve, and in particular to a plunger type safety valve.

The Prior Arts

Presently on the market, filtering device is designed to connect to front end of faucet, such that when the faucet is closed, the filtering device is connected directly to the water pipes of the local water supply plant. Therefore, when the pressure in the water pipe is increased suddenly, it could produce great impact on the filtering device, or it could even break the filtering device, to cause property damage to the user.

Therefore, at present, the design and performance of the filtering device is not quite satisfactory, and it leaves much room for improvement.

SUMMARY OF THE INVENTION

In view of the problems and drawbacks of the prior art, the present invention provides a plunger type safety valve, that is optimized in design and simple in construction, to avoid the filtering device being subject to high pressure and be damaged.

In order to achieve the objective mentioned above, the present invention provides a plunger type safety valve, including: a valve body, a valve rod, and a tube piece. Wherein, the valve body is provided with a first water inlet port and a first water outlet port, the first water inlet port is connected to a water pipe of a local water supply plant, while the first water outlet port is connected to a water input end of a filtering device. The valve rod is disposed vertically in an inner chamber of the valve body, to switch between connection and disconnection of the first water inlet port and the first water outlet port. And the tube piece is connected fixedly with a lower end of the valve body, to form into a chamber body, and is provided with a second water inlet port and a second water outlet port, the second water inlet port is connected to a water output end of the filtering device, the second water outlet port is connected to faucet, in the tube piece is provided with a water passage channel connected to the second water inlet port and the second water outlet port, and on the water passage channel is provided with water passage holes connected and in communication with the chamber body.

In the descriptions above, the valve rod is of an inverse T shape. The outer surface of the rod body is installed with a first sealing ring, a second sealing ring, and a third sealing ring, while the outer surface of its head is installed with a U shape sealing ring. An upper spring is disposed between the valve body and the upper end of the valve rod.

Further, in the descriptions above, the first water inlet port and the first water outlet port are disposed in opposite direction facing each other. The first sealing ring is disposed above the first water outlet port, the third sealing ring is disposed below the first water inlet port, and the second sealing ring is disposed below the first water outlet port and above the lowest position of the first water inlet port, to open or close the connection between the first water inlet port and the first water outlet port.

In the following, the operations of the plunger type safety valve are described in detail.

The Open Process

When the faucet is opened, the water pressure in the chamber formed by the first sealing ring and the second sealing ring is close to 0 Mpa. Due to the driving of the upper spring and the water pressure exerted on the valve rod, the valve rod is pushed to move downward.

The Close Process

When the faucet is closed, the water pressure in the chamber body at the lower portion of the valve rod is produced by area difference, and this will push the valve rod to move upward, to close the main water route connected to the water pipe of the local water supply plant, so as to reduce water pressure on the filtering device, hereby achieving protection of the filtering device.

Pressure Reduction and Protection

When the main water route is closed, since the chamber body at the lower portion of the valve rod has enough space, so that the pressure on the filtering device is transferred gradually outward. As such, the pressure exerted on the rear end of the filtering device is reduced, also the pressure exerted on the front end of the filtering device is reduced, thus achieving good protection for the filtering device.

In the present invention, the pressure difference between faucet open and close is used to control the open and close of the safety valve. When the faucet is closed, the safety valve closes the front end water route of the filtering device, to avoid the filtering device being exerted high pressure for a long period of time. The safety valve is convenient to install, and is suitable to use with various types of filtering devices.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

Figure 1:
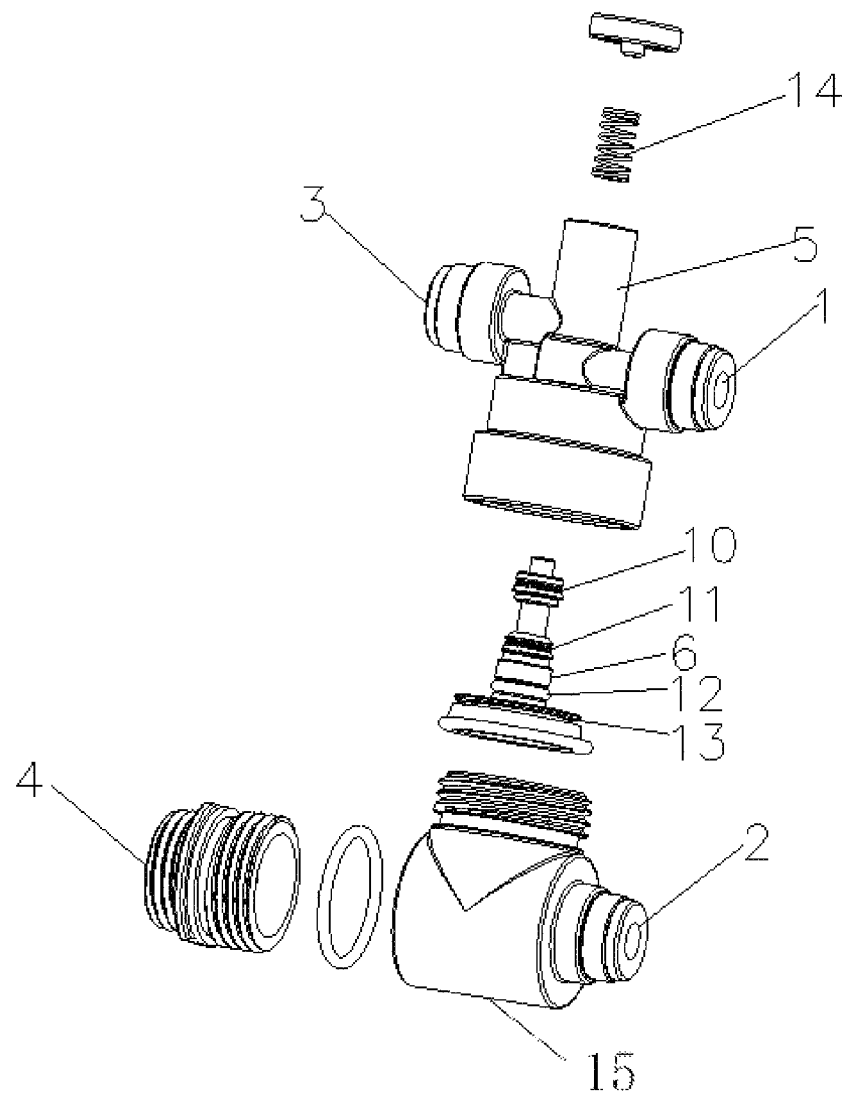
FIG. 1 is an exploded view of a plunger type safety valve according to an embodiment of the present invention.

The purpose, construction, features, functions and advantages of the present invention can be appreciated and understood more thoroughly through the following detailed description with reference to the attached drawings.

Refer to FIGS. 1, 2, 3 and 4 respectively for an exploded view of a plunger type safety valve according to an embodiment of the present invention; a cross section view of a plunger type safety valve in an open state according to an embodiment of the present invention; a cross section view of a plunger type safety valve in a close state according to an embodiment of the present invention; and a schematic diagram of a plunger type safety valve in operation according to an embodiment of the present invention.

As shown in FIGS. 1, 2, 3 and 4, the present invention provides a plunger type safety valve, including: a valve body 5, a valve rod 6, and a tube piece 15. Wherein, the valve body 5 is provided with a first water inlet port 1 and a first water outlet port 3, the first water inlet port 1 is connected to a water pipe of a local water supply plant, while the first water outlet port 3 is connected to a water input end of a filtering device. The valve rod 6 is disposed vertically in an inner chamber of the valve body 5, to switch between connection and disconnection of the first water inlet port 1 and the first water outlet port 3. And the tube piece 15 is connected fixedly with a lower end of the valve body 5, to form into a chamber body 9, and is provided with a second water inlet port 2 and a second water outlet port 4, the second water inlet port 2 is connected to a water output end of the filtering device, the second water outlet port 4 is connected to a faucet, in the tube piece 15 is provided with a water passage channel 7 connected to the second water inlet port 2 and the second water outlet port 4, and on the water passage channel 7 is provided with water passage holes 8 connected and in communication with the chamber body 9.

To optimize the design, the valve rod 6 is of an inverse T shape. The outer surface of the rod body is installed with a first sealing ring 10, a second sealing ring 11, and a third sealing ring 12, while the outer surface of its head is installed with a U shape sealing ring 13. An upper spring 14 is disposed between the valve body 5 and the upper end of the valve rod 6.

Further, the first water inlet port 1 and the first water outlet port 3 are disposed in opposite direction facing each other. The first sealing ring 10 is disposed above the first water outlet port 3, the third sealing ring 12 is disposed below the first water inlet port 1, and the second sealing ring 11 is disposed below the first water outlet port 3 and above the lowest position of the first water inlet port 1, to open or close the connection between the first water inlet port 1 and the first water outlet port 3.

In the following, the operations of the plunger type safety valve are described in detail.

The Open Process

Figure 2:
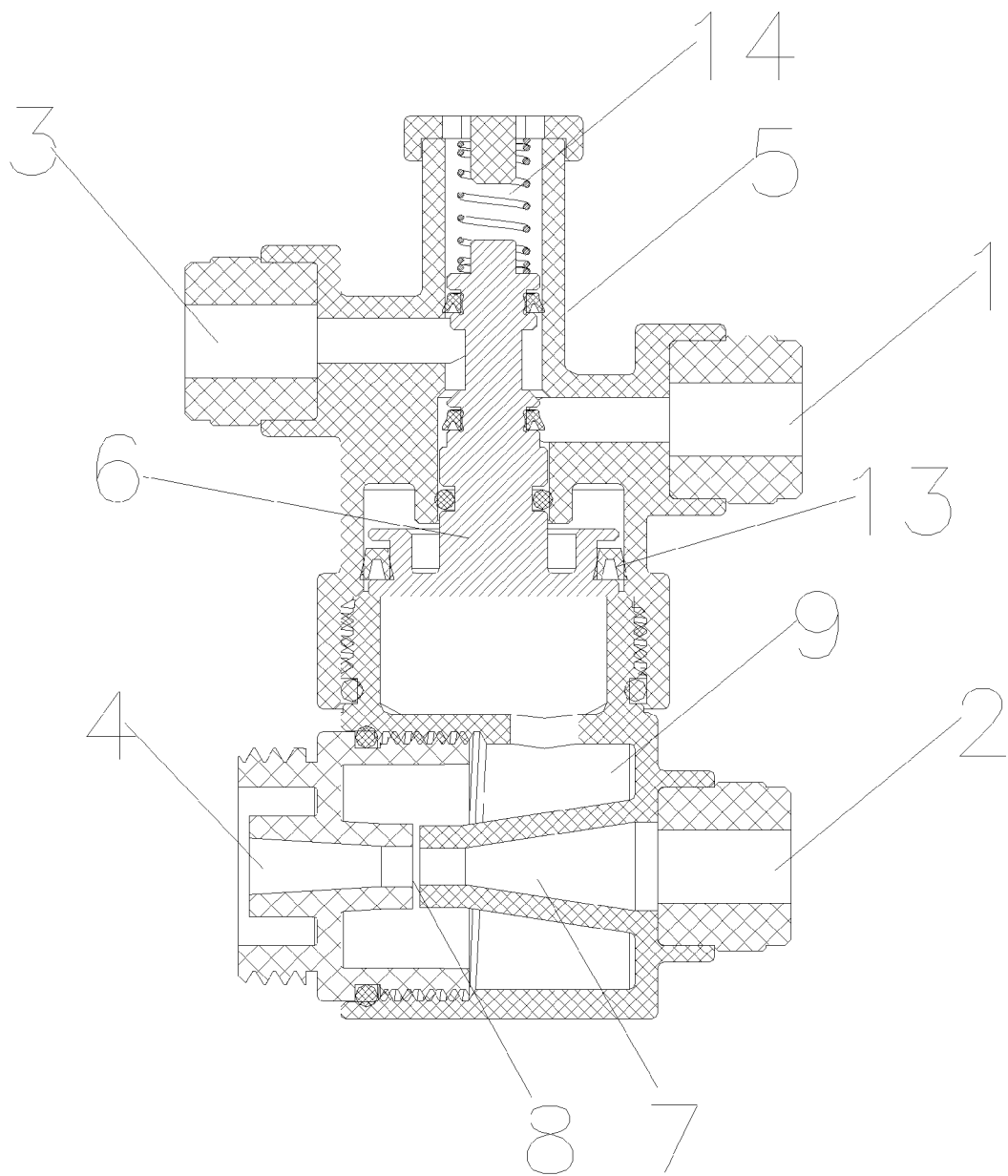
FIG. 2 is a cross section view of a plunger type safety valve in an open state according to an embodiment of the present invention.

When the faucet is opened as shown in FIG. 2, the water pressure in the chamber formed by the first sealing ring 10 and the second sealing ring 11 is close to 0 Mpa. Due to the driving of the upper spring 14 and the water pressure exerted on the valve rod 6, the valve rod 6 is pushed to move downward.

The Close Process

Figure 3:
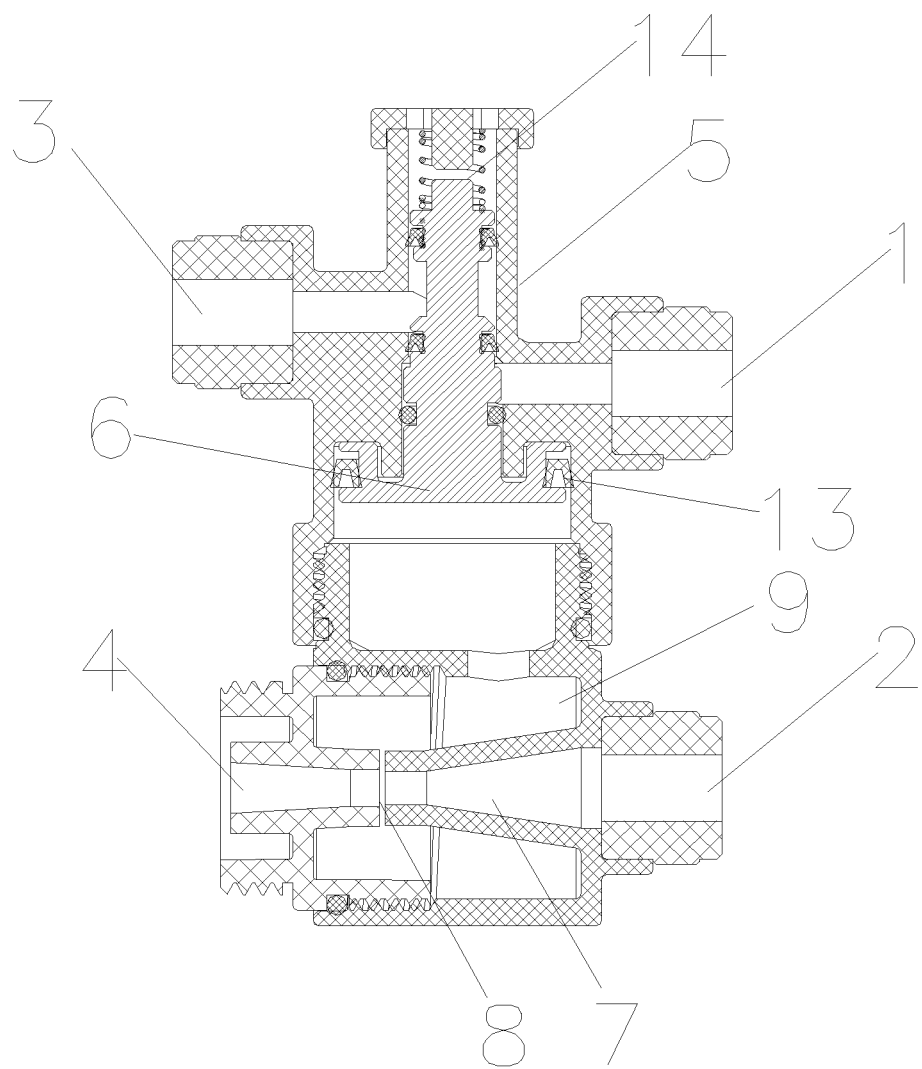
FIG. 3 is a cross section view of a plunger type safety valve in a close state according to an embodiment of the present invention.
Figure 4:
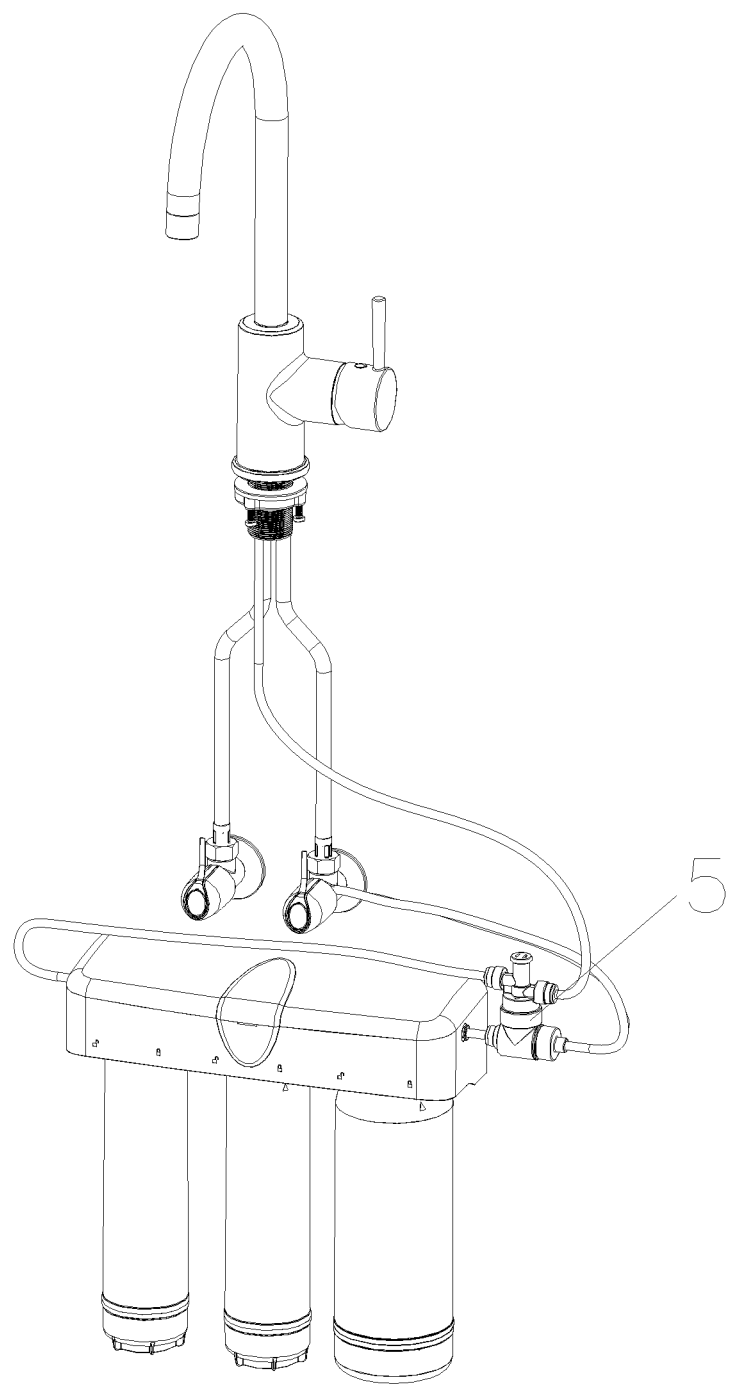
FIG. 4 is a schematic diagram of a plunger type safety valve in operation according to an embodiment of the present invention.

When the faucet is closed as shown in FIG. 3, the water pressure in the chamber body 9 at the lower portion of the valve rod 6 as produced by area difference, and that will push the valve rod 6 to move upward, to close the main water route connected to the water pipe of the local water supply plant, so as to reduce pressure on the filtering device, hereby achieving protection of the filtering device.

Pressure Reduction and Protection

When the main water route is closed, since the chamber body 9 at the lower portion of the valve rod 6 has enough space, so that the pressure on the filtering device is transferred gradually outward. As such, the pressure exerted on the rear end of the filtering device is reduced, also the pressure exerted on the front end of the filtering device is reduced, thus achieving better protection for the filtering device.

In the present invention, the pressure difference between faucet open and close is used to control the open and close of the safety valve. When the faucet is closed, the safety valve closes the front end water route of the filtering device, to avoid the filtering device being exerted high pressure for a long period of time. The safety valve is convenient to install, and is suitable to use with various types of filtering devices.

In the present invention, the Venturi tube principle is utilized, so that when the faucet is open, the air pressure and water pressure are sucked out from the faucet, so that back pressure is not generated in the chamber body 9, while the water pressure is reduced to 0 MPa. As such, due to the driving of the upper spring 14 and the pressure of the water, the valve rod 6 is pushed to move downward.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A plunger type safety valve, comprising:
    a valve body that is provided with a first water inlet port and a first water outlet port, wherein the first water inlet port is connected to a water pipe of a local water supply plant, while the first water outlet port is connected to a water input end of a filtering device;
    a valve rod that is disposed vertically in an inner chamber of the valve body, to switch between connection and disconnection of the first water inlet port and the first water outlet port; and
    a tube piece that is connected fixedly with a lower end of the valve body to form into a chamber body, and provided with a second water inlet port and a second water outlet port, wherein the second water inlet port is connected to a water output end of the filtering device, the second water outlet port is connected to a faucet; the tube piece is provided with a water passage channel connected to the second water inlet port and the second water outlet port, and the water passage channel is provided with water passage holes connected to and in communication with the chamber body.

2. The plunger type safety valve as claimed in claim 1, wherein the valve rod is of an inverse T shape, an outer surface of a rod body is installed with a first sealing ring, a second sealing ring, and a third sealing ring, while an outer surface of a head of the valve rod is installed with a U shape sealing ring, and an upper spring is disposed between the valve body and an upper end of the valve rod.

3. The plunger type safety valve as claimed in claim 2, wherein the first water inlet port and the first water outlet port are disposed in opposite directions facing each other, the first sealing ring is disposed above the first water outlet port, the third sealing ring is disposed below the first water inlet port, and the second sealing ring is disposed below the first water outlet port and above a lowest position of the first water inlet port, to open or close connection between the first water inlet port and the first water outlet port.

* * * * *